United States Patent

Thompson et al.

[11] 3,897,850
[45] Aug. 5, 1975

[54] NOISE SUPPRESSING ENGINE GUARD

[75] Inventors: John C. Thompson, Canton; Ronald H. Garman, Pekin; William C. Hurt, II, Brimfield, all of Ill.

[73] Assignee: Caterpillar Tractor Co., Peoria, Ill.

[22] Filed: Mar. 11, 1974

[21] Appl. No.: 449,646

[52] U.S. Cl. ............................ 181/33 K; 180/69 R
[51] Int. Cl.² .................... B62D 25/10; E04B 1/99
[58] Field of Search .... 181/33 K, 33 GB; 180/54 A, 180/68 P, 69 R, 89 R, 89 A

[56] References Cited
UNITED STATES PATENTS

| | | | |
|---|---|---|---|
| 2,468,809 | 5/1949 | Brock et al. | 180/69 R |
| 2,833,365 | 5/1958 | Kesl et al. | 180/69 R |
| 3,394,772 | 7/1968 | Abold | 181/33 K UX |
| 3,762,489 | 10/1973 | Proksch et al. | 181/33 K X |
| 3,820,629 | 6/1974 | Carlson et al. | 181/33 K X |

Primary Examiner—Joseph W. Hartary
Assistant Examiner—John F. Gonzales
Attorney, Agent, or Firm—Phillips, Moore, Weissenberger Lempio & Strabala

[57] ABSTRACT

Noise suppressing guard means for attenuating noise generated within the engine compartment of an earthworking vehicle. The guard means comprise a vehicle-mounted open frame member supporting a plurality of vertically disposed columnar assemblies, each assembly containing a sound-absorbing acoustic package. The means also serves to protect vulnerable elements within the engine compartment while facilitating access to engine components for servicing. The guard means permits relatively unimpeded flow of air for the vehicle cooling system.

15 Claims, 3 Drawing Figures

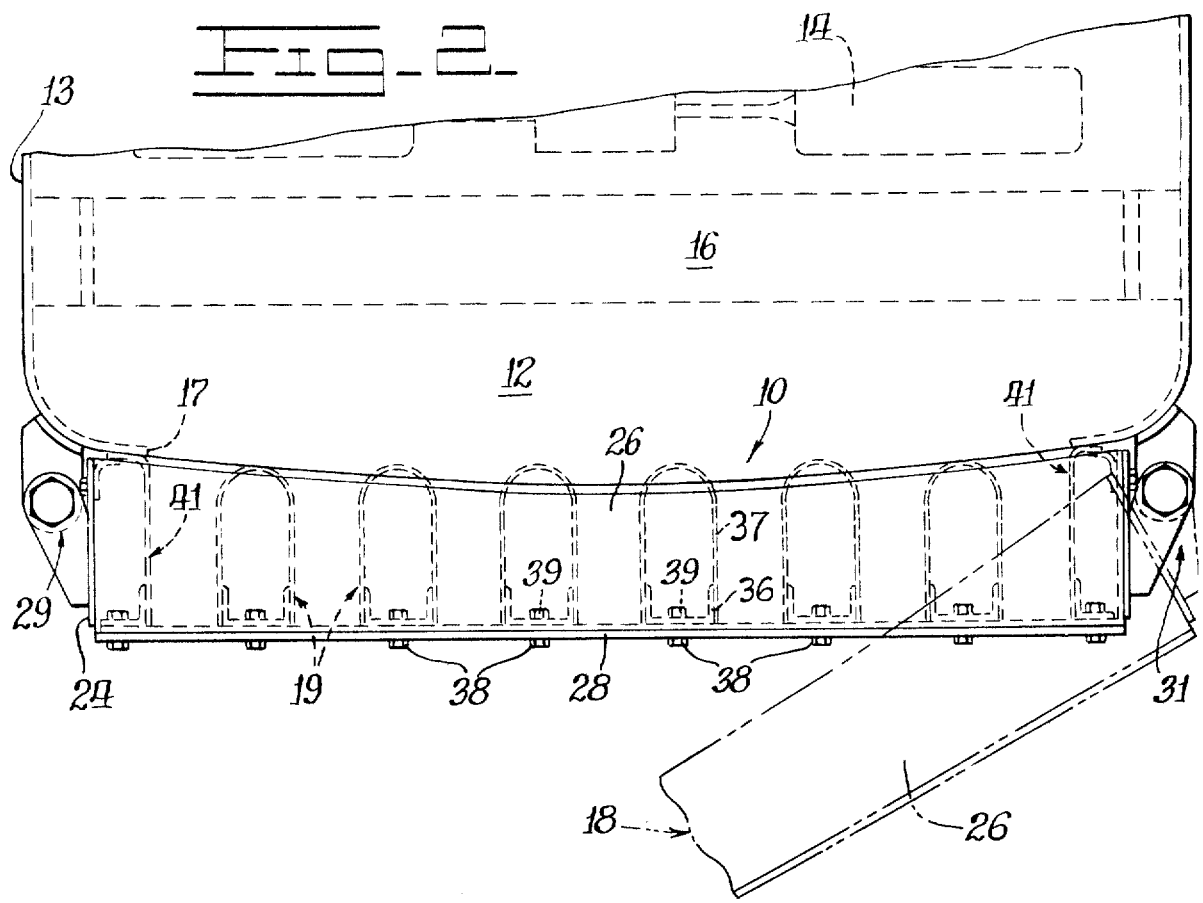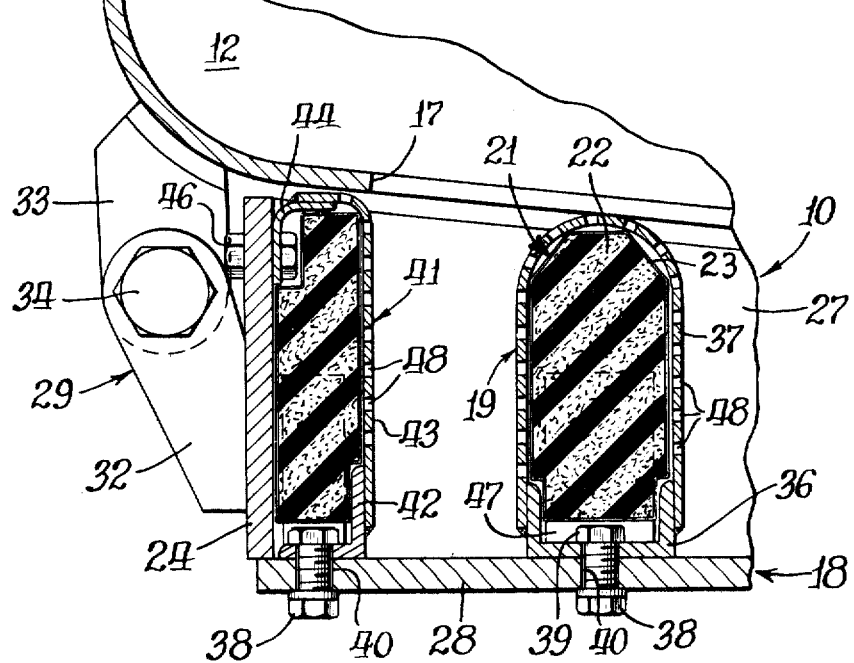

NOISE SUPPRESSING ENGINE GUARD

BACKGROUND OF THE INVENTION

Recent legislation applicable to earthworking vehicles has imposed stringent limitations upon the noise levels to which the operators of such vehicles and bystanders may be exposed. To adequately meet these limitations and protect persons and the environment from excessive noise levels, acoustical treatment systems for noise-producing components of earthworking vehicles have been developed.

One example of such noise-attenuation systems is that described in U.S. Pat. No. 3,762,489 to Proksch, et al., of common assignment herewith. While such systems are intended to provide increased noise-attenuation over typical grille and screen structures such as those described in U.S. Pat. No. 2,542,238 to Dreyfuss, servicing and maintenance procedures to keep the systems efficiently operative have frequently been difficult and time-consuming.

The environment in which vehicles such as those described in the Proksch patent operate is often severe; exposing vehicle components to extremes in temperatures and to very dirty and moist conditions. Because of this, acoustical members such as those disclosed in the patent tend to quickly become contaminated by oil or other liquids, and by moisture-laden dust particles which readily adhere to the surfaces thereof. Consequently, frequent servicing is necessary to remove these for continued sound-attenuation efficiency of these members. Such servicing normally requires the complete removal of the members from the vehicle, which removal typically entails dismantling portions of the vehicle, usually the engine enclosure, to gain access to the desired parts.

In order to obviate complex servicing techniques attendant to the use of such prior art systems, improved noise-attenuation systems have been proposed, such as that described in U.S. application Ser. No. 328,947, of common assignment herewith, filed Feb. 2, 1973 by Carlson, et al. which has issued as U.S. Pat. No. 3,820,629. The noise-attenuation system described in that application satisfactorily functions so that the associated vehicle meets many existing noise-level standards. Such system is superior to known prior art systems in many respects. However, to effect conformity of the vehicle with the stringent noise level standards in effect in certain jurisdictions, other innovations were necessary. The key problem with the noted Carlson et al. system is at least in part attributable to practical limitations on the provision of the acoustical louvers of the system with sufficient sound transmission means. In order to effect transmission of sound waves through the protective holders of the louvers to the sound-absorbing material mounted therein, perforations are provided in these holders. Preferably, approximately 40 percent of the perforated area is open to sound transmission. Since sound suppression, in a given attenuating system, is directly related to the area of such perforations, it would be desirable to perforate the top surface of the holders of the horizontally disposed louvers to increase the sound-suppression potential thereof. However, such top-surface perforations would be highly impractical, since foreign material would quickly contaminate the encased material through such perforations, thereby necessitating intolerably frequent cleaning or replacement of the sound-absorbing material. Furthermore, servicing of the Carlson et al. system has in some instances been subject to improvement. Due to occasional difficulties encountered during disengagement of the acoustical louvers of the system from the vehicle, engine and radiator protection has not been consistently effective, particularly under extremely adverse operating conditions.

It is therefore, highly desirable to provide economical noise suppression means for the engine compartment of earth working vehicles and, in particular, to provide such means which facilitate servicing of the members thereof, and which further provide effective protection to vulnerable components housed within the engine compartment.

SUMMARY AND OBJECTS OF THE INVENTION

The present invention provides noise-suppressing guard means for substantially reducing the level of noise emanating from the engine compartment of earthworking vehicles and for efficiently protecting vulnerable elements housed within such compartment, such as the heat exchanger core. The guard means facilitate access to the relatively high-maintenance components thereof and further permit the relatively unimpeded inflow of air to the engine compartment to meet engine cooling requirements.

The guard means of this invention include a demountable vehicle-mounted frame supporting a plurality of vertically disposed rigid columnar assemblies, each of which houses an acoustic package of sound-absorbing material. The vertical disposition of the assemblies with respect to the ground permits a relatively large number of perforations to be made therein without appreciable clogging tendency, thus substantially increasing the transmission of sound waves to the sound-absorbing acoustic package and substantially reducing the level of noise emanating from the compartment. Preferably, the frame member is hinge mounted on the vehicle so that it may conveniently be pivoted to provide access to the housing assemblies and acoustical packages mounted on the inner side thereof without completely demounting the frame from the vehicle. Such pivotal movement is provided because of the structural support afforded the frame member by the vertical rigid housing assemblies themselves. The rigidity of these assemblies further imparts a degree of ruggedness to the guard means substantially superior to prior art devices which depend upon relatively less durable members for protection of engine compartment components.

It is accordingly an object of this invention to provide economical, effective noise suppression means for substantially reducing the noise emanating from the engine compartment of an earthworking vehicle.

It is a further object of this invention to provide noise suppression means for an earthworking vehicle which facilitate servicing of the elements thereof.

Another object of this invention is to provide noise suppression means for an earthworking vehicle which substantially reduce the level of noise emanating from the engine compartment thereof, and further provide effective protection for vulnerable components housed within such compartment while permitting the relatively unimpeded flow of cooling air therethrough.

Other objects and advantages of the invention will become apparent from the following description and drawings.

BRIEF DESCRIPTION OF THE DRAWINGS

FIG. 2 is a fragmentary top plan view of FIG. 1, showing the disposition of the housing assemblies and acoustic packages with respect to the engine compartment and also showing in phantom the noise suppression guard means positioned for access to the assembly and acoustic package members thereof; and FIG. 3 is an enlarged cutaway partial view of FIG. 2, showing in detail the structure of the mounting means for a housing assembly and associated acoustic package, and showing a side-mounted housing assembly and associated acoustic package.

DETAILED DESCRIPTION

Figure 1:
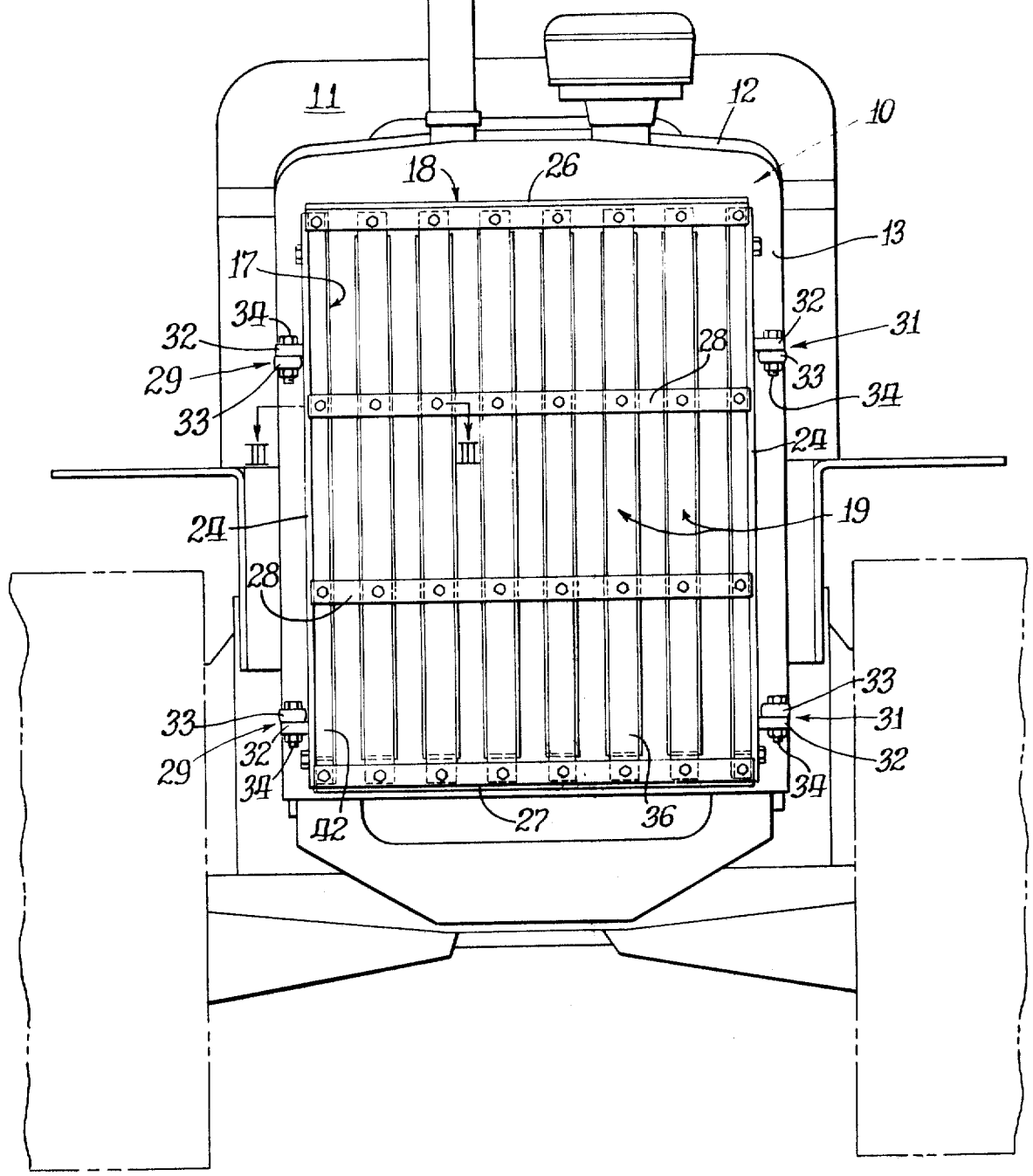
FIG. 1 is a front elevation of a typical earthworking vehicle showing the engine compartment and the noise suppression guard means of the present invention.

With reference to the drawings, noise suppression guard means of this invention are indicated generally at 10, and are shown associated with an earthworking vehicle 11 such as a track-type loader. Although the guard means 10 are depicted in this embodiment as mounted at the forward end of the vehicle engine compartment 12, it should be understood that the guard means may also be positioned at one or both sides of the engine compartment.

The engine compartment 12 comprises a relatively heavy, tunnel-like engine housing 13 containing, inter alia, a noise-emitting fan 14 and a serially arranged heat exchanger or radiator 16. The engine housing 13 is provided with a large central opening 17 permitting the inflow of air for cooling purposes to the engine compartment 12 and conversely, the egress of noise from the engine compartment.

Emanation of noise from the central opening 17 is suppressed by the guard means 10 which include an open rigid frame member 18 supporting a plurality of vertical columnar acoustic housing assemblies 19 on the inner side thereof. Each of the housing assemblies 19 contains an acoustic package 21 comprising a sound-absorbing core member 22 encased in a relatively thin casing, 23.

The frame member 18 includes a pair of side walls 24, a spanning top plate 26, a corresponding bottom plate 27, and a plurality of transversely disposed ribs 28, all of which are appropriately joined by welding, rivetting, or other suitable means. The frame member 18 is removably mounted on the vehicle 11 to facilitate convenient access to the housing assemblies 19. Preferably, the frame member 18 is pivotally mounted thereon as by oppositely spaced pairs of vertically aligned hinges generally indicated at 29 and 31, for opening as shown in phantom in FIG. 2. Conveniently, the hinges 29 and 31 comprise ears 32 and 33 having apertures, and being integral with the frame member 18 and secured to the engine housing 13, respectively. A hinge pin such as a bolt assembly 34 is inserted through the apertures of the ears and secured by means of a nut to secure the frame member to the engine housing.

As best shown in FIG. 3, each of the housing assemblies 19 includes a relatively heavy, channel base member 36 rigidly secured to a U-shaped wall 37, such as by welding, to form the hollow, open-ended housing assembly 19. The housing assemblies 19 are secured to the frame member 18 by a plurality of cap screws 38 threadably engaged by a plurality of nuts 39 secured to the inner side of the base member 36. The cap screws 38 are aligned with a plurality of corresponding apertures 40 in the transverse ribs 28 of the frame member 18, and are engaged by the nuts 39.

The frame member 18 also includes a pair of side-mounted housing assemblies 41, preferably configured as illustrated for reinforcement of the side walls 24 of the frame member. The housing assemblies 41 include a relatively heavy L-shaped base member 42 and a modified L-shaped wall 43 secured thereto by welding to form with the side wall 24 a hollow open-ended side-mounted housing assembly. The side-mounted housing assemblies 41 further include a curved angle member 44 secured to the L-shaped wall 43 by welding for increased support thereof. Preferably, the structural strength of the unit is supplemented by a plurality of cap screws 46 transversely disposed through the side wall 24 of the frame member 18 and the angle member 44 for support of the side-mounted housing assemblies 41 in addition to the support afforded by the forwardly disposed cap screws 38.

Each of the acoustic packages 21 are conveniently frictionally engaged within the housing assemblies 19 and 41 or alternatively, may be supported by a lower support member 47 secured to the housing assemblies. The core member 22 of the acoustic packages 21 is preferably an acoustical insulation material such as rigid molded glass fiber bonded with a phenolic resin. U.S. Pat. No. 3,762,489 discussed the parameters utilized in selecting such acoustical material. The casing 23 for the core member 22 is preferably a plastic coated, glass cloth membrane. Suitable casing materials include a plastic coated glass cloth membrane being approximately 0.004 inch thick and having a tensile strength of approximately 50 lb./inch of width.

A suitable material for the core 22 would include phenolic resin bonded T-Fiberglass having a density of approximately 7 lb./ft.$^3$.

Sound is transmitted to the sound absorbing core member 22 via a plurality of perforations 48 in the U-shaped walls 37 and modified L-shaped walls 43 of the housing assemblies 19 and 41, respectively. Suitably, the size and spacing of the perforations 48 are such that at least approximately 40 percent of the area is perforated and open to permit the transmission of sound waves through the walls 37 and 43. A lesser or greater perforated area may be desirable in particular applications, and this area may be varied as long as the variations are consistent with desired sound suppression characteristics and desired structural integrity of the perforated walls.

OPERATION

An appreciable portion of the noise generated within the engine compartment 12 passes through the perforations 48 in the housing assemblies 19 and 41 and the casings 23 to impinge on and be absorbed by the sound-attenuating core members 22. The inwardly facing, curved surfaces of the U-shaped walls 37 and the modified L-shaped walls 43 serve to reflect noise obliquely toward the respective adjacent housing assemblies for further noise suppression, while providing an aerodynamically streamlined profile minimizing restriction to the flow of cooling air outwardly from the fan 14 or inwardly into the compartment 12.

The vertical columnar orientation of the housing assemblies 19 and 41 provides significant rigidity to the relatively strong open frame member 18, while the relatively heavy, channel-shaped base members 36, transverse members 28, and L-shaped base members 42 present a relatively rugged front portion resistant to impact damage from tree limbs, rocks, and other recrement.

Convenient access to the housing assemblies 19 and 41 for servicing or other operations is provided. For example, by removal of the nut and bolt assemblies 34 from the hinges 29 or 31 on one side of the frame member it may be swung outwardly on the opposite hinges, as discussed above, with a minimum of sag of the guard means due to the relative rigidity of the frame member 18. The housing assemblies 19 and 41 may then be removed by detaching the appropriate retaining cap screws 46 and 38 and the cores may be replaced or serviced through the open ends of the assemblies.

Of particular importance is the number of perforations 48 which may be provided in the housing assemblies 19 and 41. Owing to the vertical orientation of such assemblies, practical limitations on the perforated areas are much more favorable as compared to those for horizontally aligned sound-attenuating devices. This is because the problem of settling of foreign materials on the top surfaces of these devices are practically eliminated. In horizontally oriented devices, such top surfaces are not, usually perforated so as to avoid contamination and clogging of the sound-absorbing material associated therewith, and the noise-attenuating characteristics of such horizontal devices are thus comparatively inferior.

In view of the foregoing, it should be apparent that the guard means of this invention provides improved noise-suppressing means for substantially reducing the level of noise emanating from the engine compartment of earthworking vehicles, while at the same time efficiently protecting vulnerable elements within the engine compartment from impact damage from the incursion of foreign materials into the compartment. Additionally, the guard means of this invention facilitates access to the elements thereof requiring relatively frequent servicing, while at the same time allowing sufficient flow of air through the guard means to satisfy the requirements of the cooling system.

Although the invention has been described with respect to a preferred embodiment, it is apparent that alternate embodiments are possible within the spirit and purview of the invention, and no limitations are intended except as defined by the scope of the appended claims.

We claim:

1. In an engine compartment enclosure for a vehicle having upper, lower, and side portions, combination guard and sound-attenuating means comprising; rigid frame means detachably mounted upon said enclosure, a plurality of elongated acoustical package means arranged in parallel spaced-apart relationship and extending in planes normal to said upper and lower portions of said vehicle to define air-flow passages therebetween for the transmission of air between the interior of said enclosure and the exterior thereof while substantially reducing the transmission of sound from said interior to said exterior, housing means for removably supportingly mounting said plurality of acoustical package means upon said rigid frame means and for providing protection for said interior against impact damage, said housing means including removable rigid means for strengthening said rigid frame means and being readily removable therefrom.

2. The invention of claim 1 wherein said housing means include a plurality of separate housing assemblies, one for each of said plurality of acoustical package means, at least one of said plural assemblies including said rigid means in the form of an elongated rigid channel member individually removably attached to said rigid frame means by removable fastening means.

3. The invention of claim 2 wherein said rigid frame means is removably hingedly mounted upon said engine compartment enclosure.

4. The invention of claim 3 wherein said rigid frame means include a plurality of first protruding ear portions each having an aperture therein, said enclosure including a corresponding plurality of second protruding ear portions each having an aperture therein, pin means for concurrent disposition in said apertures of said first and second ear portions for hingedly securing said rigid frame means upon said enclosure.

5. In an engine compartment enclosure, combination guard and sound-attenuating means comprising; rigid frame means detachably mounted upon said enclosure, a plurality elongated acoustical package means arranged in parallel spaced-apart relationship to define air-flow passages therebetween for the transmission of air between the interior of said enclosure and the exterior thereof while substantially reducing the transmission of sound from said interior to said exterior, housing means for removably supportingly mounting said plurality of acoustical package means upon said rigid frame means and for providing protection for said interior against impact damage, said housing means including rigid means for strengthening said rigid frame means, said housing means including a plurality of separate housing assemblies, one for each of said plurality of acoustical package means, at least one of said plural assemblies including said rigid means in the form of an elongated rigid channel member removably attached to said rigid frame means, said at least one of said plurality of housing assemblies including an elongated generally U-shaped wall member fixedly attached to said elongated rigid channel member and forming with said channel member an elongated internal chamber means for protectively containing one of said acoustical package means.

6. The invention of claim 5 wherein said elongated generally U-shaped wall member includes a base portion and two parallel spaced apart leg portions and wherein both of said leg portions are perforate.

7. The invention of claim 6 wherein said acoustical package means include a core member of rigid molded glass fiber bonded with a phenolic resin and encased within a membrane casing member.

8. In an engine compartment enclosure, combination guard and sound-attenuating means comprising; rigid frame means detachably mounted upon said enclosure, a plurality elongated acoustical package means arranged in parallel spaced-apart relationship to define air-flow passages therebetween for the transmission of air between the interior of said enclosure and the exterior thereof while substantially reducing the transmission of sound from said interior to said exterior, housing means for removably supportingly mounting said plurality of acoustical package means upon said rigid frame means and for providing protection for said interior against impact damage, said housing means including rigid means for strengthening said rigid frame means, said housing means including a plurality of separate housing assemblies, one for each of said plurality of acoustical package means, at least one of said assemblies including an elongated rigid member having an L-shaped cross-sectional configuration and being removably attached to said rigid frame means, said at least one of said plurality of housing assemblies including an elongated generally J-shaped wall member fixedly attached to said elongated rigid member having an L-shaped cross-sectional configuration and forming with said L-shaped member and said frame means a second elongated internal chamber means for protectively containing another of said acoustical package means.

9. The invention of claim 8 wherein said J-shaped wall member is perforate.

10. The invention of claim 8 wherein said another acoustical package means include an elongated core member at least partially composed of molded glass fiber, said core member being protectively enclosed in a casing member.

11. In an engine compartment enclosure, combination guard and sound-attenuating means comprising; rigid frame means detachably mounted upon said enclosure, a plurality elongated acoustical package means arranged in parallel spaced-apart relationship to define air-flow passages therebetween for the transmission of air between the interior of said enclosure and the exterior thereof while substantially reducing the transmission of sound from said interior to said exterior, housing means for removably supportingly mounting said plurality of acoustical package means upon said rigid frame means and for providing protection for said interior against impact damage, said housing means including rigid means for strengthening said rigid frame means, said housing means including a plurality of separate housing assemblies, one for each of said plurality of acoustical package means, at least one of said plural assemblies including said rigid means in the form of an elongated rigid channel member removably attached to said rigid frame means, at least another one of said assemblies including an elongated rigid member having an L-shaped cross-sectional configuration and being removably attached to said rigid frame means, said rigid frame means including first, second, third and fourth interconnected structural members forming an open rectangular structure, said L-shaped elongated rigid member extending between said first and third structural members in parallel relation to said second and fourth members, and said elongated rigid channel member also extending between said first and third structural members in parallel spaced apart relationship to said L-shaped elongated rigid member.

12. The invention of claim 11 wherein said rigid frame means further include a plurality of transverse rib members attached to said second and fourth structural members.

13. The invention of claim 12 wherein said transverse rib members are concurrently attached to said L-shaped member and said channel member.

14. In an engine compartment enclosure, combination guard and sound-attenuating means comprising; rigid frame means detachably mounted upon said enclosure, a plurality elongated acoustical package means arranged in parallel spaced-apart relationship to define air-flow passages therebetween for the transmission of air between the interior of said enclosure and the exterior thereof while substantially reducing the transmission of sound from said interior to said exterior, housing means for removably supportingly mounting said plurality of acoustical package means upon said rigid frame means and for providing protection for said interior against impact damage, said housing means including rigid means for strengthening said rigid frame means, said housing means including a plurality of separate housing assemblies, one for each of said plurality of acoustical package means, at least one of said assemblies including an elongated rigid member having an L-shaped cross-sectional configuration and being removable attached to said rigid frame means.

15. In an engine compartment enclosure, combination guard and sound-attenuating means comprising; rigid frame means detachably mounted upon said enclosure, a plurality elongated acoustical package means arranged in parallel spaced-apart relationship to define air-flow passages therebetween for the transmission of air between the interior of said enclosure and the exterior thereof while substantially reducing the transmission of sound from said interior to said exterior, housing means for removably supportingly mounting said plurality of acoustical package means upon said rigid frame means and for providing protection for said interior against impact damage, said housing means including rigid means for strengthening said rigid frame means, said housing means including a plurality of separate housing assemblies, one for each of said plurality of acoustical package means, at least one of said plural assemblies including said rigid means in the form of an elongated rigid channel member removably attached to said rigid frame means, at least another one of said assemblies including an elongated rigid member having an L-shaped cross-sectional configuration and being removably attached to said rigid frame means.

* * * * *